United States Patent
Huh

Patent Number: 6,016,172
Date of Patent: Jan. 18, 2000

[54] METHOD FOR REDUCING A CHANNEL HOPPING TIME IN AN MPEG-2 SYSTEM DECODER

[75] Inventor: Jun-Ho Huh, Kyungki-do, Rep. of Korea

[73] Assignee: Samsung Electronics Co., Ltd., Kyungki-do, Rep. of Korea

[21] Appl. No.: 08/747,316

[22] Filed: Nov. 13, 1996

[30] Foreign Application Priority Data

Nov. 28, 1995 [KR] Rep. of Korea ................ 95-44331

[51] Int. Cl.$^7$ ........................................... H04N 7/18
[52] U.S. Cl. ................ 348/845.1; 348/460; 348/461; 348/845.2
[58] Field of Search .............. 348/845.1, 845.2, 348/460, 461, 462, 465, 466, 467, 423, 384, 385, 386, 845.3; 370/389, 397, 509; 364/514, 515; 380/49, 50

[56] References Cited

U.S. PATENT DOCUMENTS

| | | | |
|---|---|---|---|
| 4,954,899 | 9/1990 | Tanabe et al. | 455/186 |
| 5,602,920 | 2/1997 | Bestler et al. | 380/49 |
| 5,650,825 | 7/1997 | Naimpally et al. | 348/465 |
| 5,726,989 | 3/1998 | Dokic | 348/423 |
| 5,734,589 | 3/1998 | Kostreski | 348/10 |
| 5,826,166 | 10/1998 | Brooks et al. | 348/10 |

*Primary Examiner*—Anand S. Rao
*Attorney, Agent, or Firm*—Sughrue, Mion, Zinn, Macpeak & Seas, PLLC

[57] ABSTRACT

A method of reducing a channel hopping time in an MPEG-2 system decoder which can improve the performance of a receiver by minimizing the response time in the event of changing the receiving channel. According to the method, a predetermined storage region is provided in a DRAM, and packet identifier (PID) values of audio and video signals of each program are stored in the storage region. Thereafter, if a receiving channel is changed, the channel-changing operation is performed using the PID values of the audio and video signals stored in the storage region, and thus the time required for the channel change is shortened, thereby reducing the channel hopping time.

3 Claims, 1 Drawing Sheet

METHOD FOR REDUCING A CHANNEL HOPPING TIME IN AN MPEG-2 SYSTEM DECODER

BACKGROUND OF THE INVENTION

FIELD OF THE INVENTION

The present invention relates to an MPEG-2 system decoder for use in a video receiving apparatus. More particularly, the present invention relates to a method of reducing a channel hopping time in an MPEG-2 system decoder by minimizing the response time in the receiver when the 10 receiving channel is changed.

Generally, when a broadcasting signal is received using the MPEG-2 system decoder, program specific information (PSI) is used for reception. The PSI includes a program association table (PAT), program map table (PMT), network information table (NIT), conditional access table (CAT), etc. The PAT has a PMT packet identifier (PID) for all programs, and the PMT has video and audio PID information corresponding to each program. The NIT has information on physical network parameters such as FDM frequency and the number of transponders. The CAT has PID information for an entitlement management message (EMM) and so on. The PAT, PMT, and CAT are composed of 1024 bytes, i.e., 6 packets (1 packet=188 bytes) in maximum length, and the NIT is composed of 4096 bytes in maximum length.

FIG. 1 shows a conventional PID detecting structure in an MPEG-2 system decoder. Referring to FIG. 1, the conventional PID detecting structure is provided with a host processor 10, a PID register 11, a PID detecting section 12, a dynamic random access memory (DRAM) 14, and a DRAM interface 13. The PID detecting section 12 detects the PID from an input bit stream and provides the detected PID to the DRAM interface 13. The DRAM interface 13 transmits the PID output from the PID detecting section 12 to the DRAM 14. Concurrently, the DRAM interface transmits a PID read-out from the DRAM 14 to the host computer 10. The DRAM 14 stores the PID input through the DRAM interface 13, and provides a stored PID to the host computer 10 through the DRAM interface 13. The host computer 10 reads out the PMT PID values stored in the DRAM 14 and analyzes the read-out data to control the PID detecting section 12. A desired PID is output from the host to the detecting section through the PID register 11. The host computer 10 also performs search operations for the PID of the audio and video signals of a selected program by analyzing the PID read out from the DRAM.

The operation of the conventional MPEG-2 system decoder while searching for the audio and video PID of a selected program will now be explained in detail. When a PAT is input to the decoder, the PAT is stored in the DRAM 14. The host computer 10 reads out and analyzes the PAT stored in the DRAM 14 to determine the PMT PID of a selected program. The host computer 10 then outputs the corresponding PID value to the PID register 11, so that the PID detecting section 12 detects a packet having the corresponding PID value and stores the detected packet in the DRAM 14. If all the PMTs are stored in the DRAM 14, the host computer 10 reads out from the DRAM 14 and analyzes the corresponding information, determines the audio and video PID value corresponding to the selected program, and then performs detection of the audio and video signals in accordance with the PID value.

The conventional PID detecting system suffers from the disadvantages in that it requires a long channel hopping time because the audio and video PID corresponding to the selected channel can only be found after all the PSI packets are received after power up. Further, when the power is initially input or when channel selection is made, the conventional system requires sequential access to the PAT, PMT, etc. stored in the DRAM 14 and then analysis of the accessed data in order to find out the audio and video PID corresponding to the program of a selected channel. This results in a long response time.

SUMMARY OF THE INVENTION

It is an object of the present invention to solve the problems involved in the prior art, and to provide a method of reducing a channel hopping time in an MPEG-2 system decoder used in a receiving device by minimizing the response time when the receiving channel is changed.

In one aspect of the present invention, there is provided a method of reducing a channel hopping time in an MPEG-2 system decoder, said decoder including a memory section, comprising the steps of: detecting packet identifier (PID) values of audio and video signals of a plurality of programs; storing detected PID values in a predetermined storage region of the memory section designated for PID values for audio and video signals; accessing said PID values of said audio and video signals stored in said storage region; and performing a channel-changing operation in accordance with said accessed PID values in said storage region when a receiving channel is changed.

In another aspect of the present invention, there is provided a method of reducing a channel hopping time in an MPEG-2 system decoder, said decoder including a memory section, a main power supply, and an auxiliary power supply comprising the steps of: performing an initial program specific information (PSI) processing operation on packet identifiers (PID) for audio and visual signals for a plurality of programs by performing a channel-setting operation; storing PID values of said audio and video signals of said plurality of programs in a predetermined storage region of the memory section designated for PID values of audio and video signals; accessing said PID values of said audio and video signals stored in said storage region; performing a channel-changing operation in accordance with said accessed PID values when a receiving channel is changed; and preserving said PID values of said audio and video signals stored in said storage region by continuously supplying power to said storage region by the auxiliary power supply when the main power supply to the decoder is cut off.

BRIEF DESCRIPTION OF THE DRAWINGS

The above object, features and advantages of the present invention will become more apparent by a description of preferred embodiments with reference to the accompanying drawings, in which.

DETAILED DESCRIPTION OF PREFERRED EMBODIMENTS

The preferred embodiments of the present invention will be explained in detail with reference to the accompanying drawings.

The acquisition time T of a signal in the MPEG-2 system decoder is given by $$T = \text{PAT period} + \text{PAT processing time} + \text{PMT period} + \text{PMT processing time} + \alpha \quad (1)$$

In the expression (1), the PAT period corresponds to the period during which the PAT is transmitted. The PAT period greatly affects the acquisition time of the signal since at the moment of power up or channel selection, the PAT or PMT has just lapsed, and acquisition must be made upon a subsequent PAT or PMT. The parameter "$\alpha$" includes a waiting time for FDM tuning, sequence header generating time, DRAM access time, etc.

In the conventional MPEG-2 system decoder structure, the acquisition time of a signal, for example, a 'Mugunghwa' satellite broadcasting signal, is calculated as follows:

$$T = 0.5 \text{ second} + T_{PAT\_Proc} + 0.5 \text{ second} + T_{PAT\_Proc} + \alpha \quad (2)$$

The PSI transmission period of the 'Mugunghwa' satellite broadcasting signal is at least 1 second.

Figure 1:
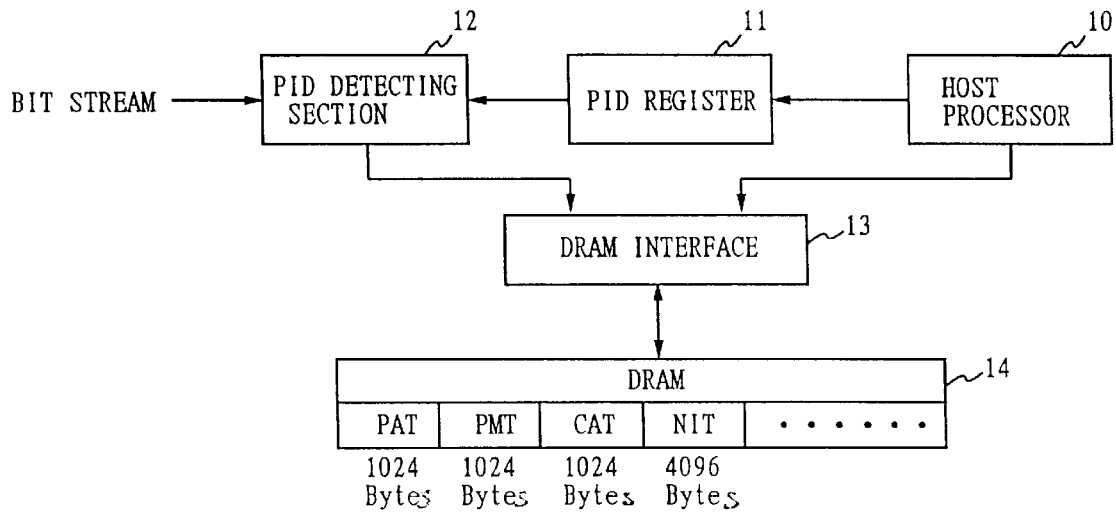
FIG. 1 is a block diagram of a conventional PID detecting structure of an MPEG-2 system decoder.
Figure 2:
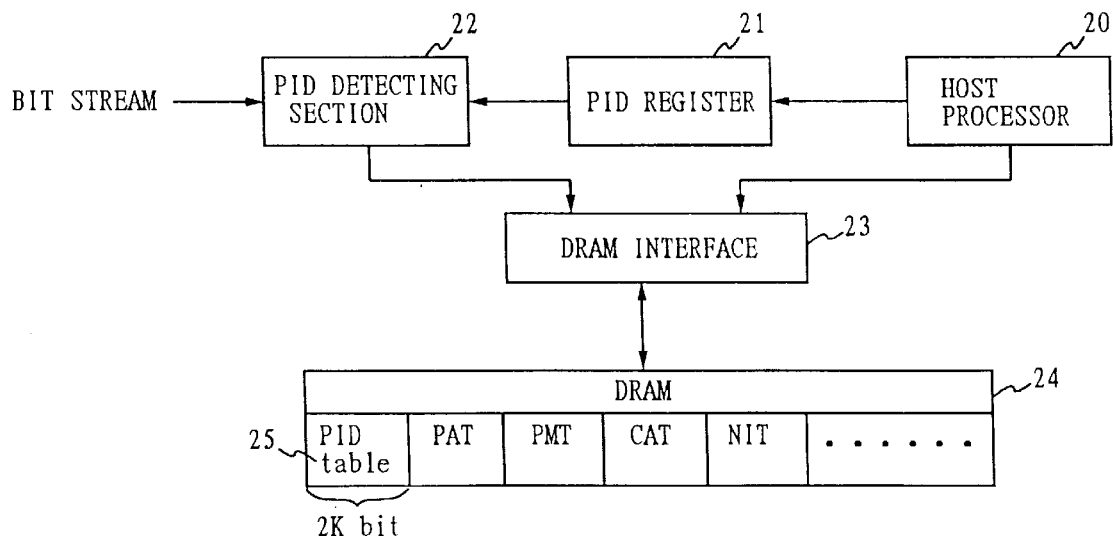
FIG. 2 is a block diagram of the PID detecting structure of an MPEG-2 system decoder according to the present invention.

FIG. 2 is a block diagram of the structure of the MPEG-2 system decoder for performing the method according to the present invention. Referring to FIG. 2, the decoder is provided with a host processor 20, a PID register 21, a PID detecting section 22, a DRAM interface 23, and a DRAM 24. The DRAM 24 includes a dedicated storage region 25 for storing PID values.

The operation of the decoder structure according to a first embodiment of the present invention will be explained below.

In the event that a supply power is input, a receiver waits for the input of a PAT. When the PAT is input, it is stored in the DRAM 24. The host computer 20 reads out and analyzes the PAT stored in the DRAM 24 to determine the PMT PID of the selected program. The host computer 20 then outputs the corresponding PID value to the PID register 21, so that the PID detecting section 22 detects a packet having the corresponding PID value and stores the detected packet in the DRAM 24. If all the PMTs are stored in the DRAM 24, the host computer 20 reads out from the DRAM 24 and analyzes the corresponding information, determines the audio and video PID value corresponding to a selected program, and then the decoder performs detection of the audio and video signals in accordance with the PID values.

At this time, the host computer 20 addresses the storage region 25 of the DRAM 24 and stores therein the PID values of the corresponding audio and video signals. Thereafter, if the receiving channel is changed, the host computer 20 performs a channel-changing operation by accessing the audio and video PID value stored in the storage region 25 of the DRAM 24 without analyzing of the PAT and PMT being received, thereby reducing the channel hopping time. For example, in case of the 'Mugunghwa' satellite broadcasting signal, the planned number of programs is determined to be 12, while the MPEG-2 system decoder is designed to process a maximum 60 programs. Thus, a storage capacity of 60×2×13 bits is required to store the audio and video PIDs of 60 programs. Accordingly, by additionally providing the storage region 25 having a storage capacity of about 2 K bits in the DRAM 24, the time for searching the audio and video PID values can be shortened when the receiving channel is changed, resulting in the reduction of the channel hopping time.

The operation of the decoder structure according a second embodiment of the present invention will be explained below.

In this embodiment, even when a main power supply is cut off to other decoder elements, the PID values stored in the storage region 25 can be preserved by continuously providing auxiliary power to the storage region 25. Initially, the PSI processing operation for the PID analysis of every program is pre-performed by performing the channel-setting operation utilizing a channel-setting button, and the set PID values of audio and video signals are stored in the storage region 25. Once the channel-setting operation is complete, the channel hopping time can be minimized when the power supply is input to the remainder of the decoder system or when a receiving channel is changed. The channel hopping time required according to the present invention is given by $$T = T\text{Memory-Access} + \alpha \quad (3)$$

In the event that the present method is applied to a receiver for receiving, for example, a 'Mugunghwa' satellite broadcasting signal, the channel hopping time can be reduced by approximately one second or more.

Generally, in an MPEG-2 type broadcasting system, the PID values are not changed once they are determined. However, in a special case where a rearrangement of the PID values has been made, version number information, which is a parameter contained in the packet of the PAT, PMT, etc., indicates such changes of the PID values. Accordingly, a search for only the version number, after the PID values of all the programs are completely stored in the storage region 25, can accommodate changes in the PID values.

From the foregoing, it will be apparent that the method according to the present invention provides the advantages in that since a predetermined storage region is provided in a DRAM for storing PID values of audio and video signals of every program, and a channel-changing operation is performed using the stored PID values when a receiving channel is changed, the time required for a channel change can be shortened, and thus the channel hopping time can be reduced, thereby improving the performance of a receiver.

While the present invention has been described and illustrated herein with reference to the preferred embodiments thereof, it will be understood by those skilled in the art that various changes in form and details may be made without departing from the spirit and scope of the invention.

What is claimed is:

1. A method of reducing a channel hopping time in an MPEG-2 system decoder, said decoder including a memory section, comprising the steps of:

extracting packet identifier (PID) values from program packets of audio and video signals of each of a plurality of programs contained in a received broadcast signal;

storing said detected PID values in a predetermined storage region of the memory section designated for PID values of the audio and video signals; and accessing said PID values of said audio and video signals stored in said designated storage region and performing a channel-changing operation in accordance with said accessed PID values in said storage region when a receiving channel is changed.

2. A method of reducing a channel hopping time in an MPEG-2 system decoder, said decoder including a memory section, a main power supply, and an auxiliary power supply comprising the steps of:

performing an initial program specific information (PSI) processing operation by extracting packet identifiers (PID) from program packets for audio and video signals of a plurality of programs by performing a channel-setting operation;

storing the PID values of said audio and video signals of said plurality of programs in a predetermined storage region of the memory section designated for PID values of the audio and video signals;

accessing said PID values of said audio and video signals stored in said storage region and performing a channel-changing operation in accordance with said accessed PID values when a receiving channel is changed; and preserving said PID values of said audio and video signals stored in said storage region by continuously supplying power to said storage region by the auxiliary power supply when the main power supply to the decoder is cut off.

3. A method of reducing a channel hopping time in an MPEG-2 system decoder, said decoder including a memory section and a predetermined storage region of the memory section, comprising the steps of:

inputting a program association table (PAT) and storing the PAT in the memory section;

reading out and analyzing the PAT stored in the memory section to determine a program map table packet identifier (PMT PID) of a selected program;

detecting the packet identifier (PID) values and storing the detected packet in the memory section;

extracting the packet identifier (PID) values of audio and video signals of each of a plurality of programs contained in a received broadcast signal stored in the memory section;

storing said extracted PID values in the predetermined storage region of the memory section designated for PID values of the audio and video signals; and accessing said PID values of said audio and video signals stored in said designated storage region and performing a channel-changing operation in accordance with said accessed PID values in said storage region when a receiving channel is changed.

* * * * *